(12) United States Patent
Lin (10) Patent No.: US 11,562,772 B2
(45) Date of Patent: Jan. 24, 2023

(54) VIDEO PROCESSING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Jinquan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/232,076

(22) Filed: Apr. 15, 2021

(65) Prior Publication Data
US 2021/0233572 A1   Jul. 29, 2021

Related U.S. Application Data

(63) Continuation of application No. PCT/CN2019/104162, filed on Sep. 3, 2019.

(30) Foreign Application Priority Data

Oct. 15, 2018   (CN) .......................... 201811198857.3

(51) Int. Cl.
   *G11B 27/36*   (2006.01)
   *H04N 7/01*    (2006.01)
   *H04N 9/87*    (2006.01)

(52) U.S. Cl.
   CPC .............. *G11B 27/36* (2013.01); *H04N 7/01* (2013.01); *H04N 9/87* (2013.01)

(58) Field of Classification Search
   CPC . G11B 27/36; H04N 7/01; H04N 9/87; H04N 21/4424; H04N 21/4318; H04N 21/462; H04N 21/42653; H04N 21/44008
   (Continued)

(56) References Cited

U.S. PATENT DOCUMENTS

2003/0185306 A1   10/2003   MacInnis et al.
2011/0126104 A1*  5/2011    Woods ................. H04N 21/482
                                            725/86
(Continued)

FOREIGN PATENT DOCUMENTS

CN   101577110   11/2009
CN   102053952   5/2011
(Continued)

OTHER PUBLICATIONS

EPO, Search Report for EP Application No. 19873394.1, dated Aug. 26, 2021.
(Continued)

*Primary Examiner* — Thai Q Tran
*Assistant Examiner* — Nienru Yang
(74) *Attorney, Agent, or Firm* — Hodgson Russ LLP (57) ABSTRACT

Provided are a video processing method, an electronic device, and a storage medium. The method is applied to an electronic device, and includes: acquiring decoding information when decoding a video file; and determining whether the decoding information is abnormal. The method further includes: in response to detecting the decoding information is abnormal, adding an identifier of the video file into a preset blacklist; and in response to detecting the decoding information is normal, adding the identifier of the video file into a preset whitelist, and performing display enhancement processing on the video file.

17 Claims, 5 Drawing Sheets

(58) Field of Classification Search
USPC .......................................................... 386/283
See application file for complete search history.

(56) References Cited

U.S. PATENT DOCUMENTS

| | | | |
|---|---|---|---|
| 2011/0307923 | A1 | 12/2011 | Kouzi et al. |
| 2015/0243200 | A1 | 8/2015 | Pan |
| 2015/0350232 | A1* | 12/2015 | Liu .................... H04L 63/1433 726/23 |
| 2017/0127074 | A1 | 5/2017 | Wu et al. |
| 2018/0007400 | A1 | 1/2018 | Chen et al. |
| 2018/0278929 | A1 | 9/2018 | Jia |

FOREIGN PATENT DOCUMENTS

| | | |
|---|---|---|
| CN | 102761736 | 10/2012 |
| CN | 103700385 | 4/2014 |
| CN | 104394456 | 3/2015 |
| CN | 104754349 | 7/2015 |
| CN | 104796768 | 7/2015 |
| CN | 104980797 | 10/2015 |
| CN | 105898348 | 8/2016 |
| CN | 105992056 | 10/2016 |
| CN | 106559679 | 4/2017 |
| CN | 106792066 | 5/2017 |
| CN | 106851386 | 6/2017 |
| CN | 107172432 | 9/2017 |
| CN | 107801095 | 3/2018 |
| CN | 108040258 | 5/2018 |
| CN | 104980788 | 8/2018 |
| CN | 108366288 | 8/2018 |
| CN | 108600816 | 9/2018 |
| WO | 2018171548 | 9/2018 |

OTHER PUBLICATIONS

SIPO, First Office Action for CN Application No. 201811198857.3, dated Oct. 23, 2019.
SIPO, Notification to Grant Patent Right for Invention for CN Application No. 201811198857.3, dated Jan. 20, 2020.
WIPO, International Search Report for PCT Application No. PCT/CN2019/104162, dated Nov. 28, 2019.
EPO, Office Action for EP Application No. 19873394.1, dated Sep. 23, 2022.

* cited by examiner

VIDEO PROCESSING METHOD, ELECTRONIC DEVICE, AND STORAGE MEDIUM

CROSS-REFERENCE TO RELATED APPLICATION

This application is a continuation of International Application No. PCT/CN2019/104162, filed on Sep. 3, 2019, which claims priority to Chinese Patent Application No. 201811198857.3, filed on Oct. 15, 2018. The entire disclosures of the aforementioned applications are incorporated herein by reference.

TECHNICAL FIELD

This disclosure relates to the technical field of electronic devices, and particularly to a video processing method, an electronic device, and a storage medium.

BACKGROUND

With the development of science techniques, electronic devices have become one of the most commonly used electronic products in people's daily lives. In particular, users often watch videos or play games through the electronic devices. Moreover, the electronic devices can process videos to improve the playback effect of the videos.

BRIEF DESCRIPTION OF THE DRAWINGS

In order to explain the technical solutions in the embodiments of the present disclosure more clearly, drawings needed in the description of the embodiments will be briefly introduced below. Obviously, the drawings described below illustrate only some embodiments of the present disclosure. For those skilled in the art, other drawings can also be obtained from these drawings without creative work.

DETAILED DESCRIPTION OF PREFERRED EMBODIMENTS

In order to enable those skilled in the art to better understand the solutions of the present disclosure, the technical solutions in the embodiments of the present disclosure will be described clearly and completely in conjunction with the accompanying drawings in the embodiments of the present disclosure.

Figure 1:
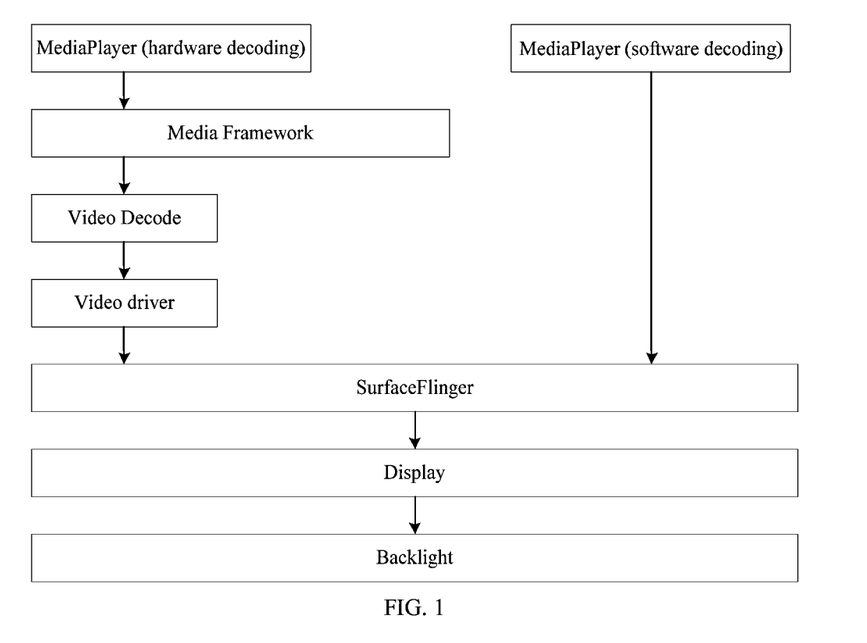
FIG. 1 illustrates a schematic diagram of a video playback process provided by an embodiment of the present disclosure.

Referring to FIG. 1, a video playback process is illustrated. In specific, once the operating system acquires data to be played, audio and video data are parsed. Generally, a video file is composed of a video stream and an audio stream. Different video files have different packaging formats for the audio and video. A process of synthesizing the audio stream and the video stream into a media file is referred to as muxer, and a process of separating the audio stream and the video stream from the media file is referred to as demuxer. For playing a video file, it is required to separate the audio stream and the video stream from the file stream, and decode the audio and video streams respectively. After the decoding, the resulting video frames may be directly rendered, and the resulting audio frames may be sent to a buffer of an audio output device for playback. Of course, the time stamp of rendering the video frames needs to be synchronized with the time stamp of playing the audio frames.

Specifically, video decoding may include hardware decoding and software decoding. Regarding the hardware decoding, a part of video data that was originally processed by the Central Processing Unit (CPU) is transferred to a Graphics Processing Unit (GPU), where the parallel computing power of the GPU is much higher than that of the CPU. This can greatly reduce the load on the CPU. After the occupancy rate of the CPU is decreased, some other applications may run simultaneously. Of course, for a good processor of excellent performance, such as i5 2320 or any quad-core processor from AMD, both the hardware decoding and the software decoding can be performed.

Specifically, as shown in FIG. 1, a Media Framework acquires, through an API interface with a client side, a video file to be played by the client side, and sends it to a video codec (Video Decode). The Media Framework is a multimedia framework in the Android system, and three parts, i.e., MediaPlayer, MediaPlayerService and Stagefrightplayer, constitute the basic multimedia framework of Android. The multimedia framework adopts a C/S structure, in which MediaPlayer serves as the client side of the C/S structure, and MediaPlayerService and Stagefrightplayer serve as a server side of the C/S structure which is responsible for playing a multimedia file. The server side completes a request from the client side and makes a response thereto, through Stagefrightplayer. Video Decode is a super decoder that integrates the most commonly used decoding and playback functions for audio and video, and is used to decode video data, and send the decoded video data to a video driver for subsequent transmission.

The software decoding means that the CPU is used, through software, to decode the video. The hardware decoding means that the video decoding tasks are independently performed by a dedicated daughter card device without using the CPU.

Regardless of whether it is the hardware decoding or the software decoding, after the video data is decoded, the decoded video data is sent to a layer transfer module (SurfaceFlinger), and then rendered and synthesized by SurfaceFlinger for display on a display screen. SurfaceFlinger is an independent service. It receives Surfaces of all Windows as input, calculates, according to parameters such as ZOrder, transparency, size and position, the position of each Surface in the finally synthesized image, and then sends it to HWComposer or OpenGL to generate the final FrameBuffer for display on a specific display device such as a backlight display.

As shown in FIG. 1, in the software decoding, the CPU decodes the video data and sends the decoded video data to SurfaceFlinger for rendering and synthesis; while for the hardware decoding, the video data is decoded by the GPU and then sent to SurfaceFlinger for rendering and synthesis. SurfaceFlinger will call the GPU to achieve rendering and synthesis of images for display on a display screen.

The existing electronic devices process the video data in a fixed way. For example, for some video data, the existing electronic devices first select, according to the format of the video data, a corresponding decoding mode to decode it, and then perform display enhancement processing on the decoded video data. However, in a case where the decoding mode corresponding to the format of the video file has poor performance, a long time is spent in decoding, and thus the GPU is occupied for a long time; accordingly, problems of screen flicker and jamming would happen when the display enhancement processing is performed. In view of the above problems, after long-term research, the inventor has proposed the video processing method and apparatus, electronic device, and storage medium provided by the embodiments of this disclosure, by which it is detected whether the decoding information of the video file acquired in the decoding process is abnormal, and the blacklist and whitelist are dynamically managed according to the result of the detection, so as to reduce the probability of video jamming, and improve the playback effect and the user experience. The specific video processing method will be described in detail in the subsequent embodiments.

In the embodiments of the present disclosure, a video processing method for an electronic device is provided. The method includes: acquiring decoding information when decoding a video file; adding an identifier of the video file to a preset blacklist, in response to detecting the decoding information is abnormal; and adding the identifier of the video file to a preset whitelist and performing display enhancement processing on the video file, in response to detecting the decoding information is not abnormal.

In the embodiments of the present disclosure, a video processing apparatus for an electronic device is further provided. The apparatus includes a decoding information acquiring module, a decoding information detecting module, a blacklist adding module and a whitelist adding module. The decoding information acquiring module is configured to acquire decoding information when decoding a video file. The decoding information detecting module is configured to detect whether the decoding information is abnormal. The blacklist adding module is configured to add an identifier of the video file to a preset blacklist when the decoding information is abnormal. The whitelist adding module is configured to add the identifier of the video file to a preset whitelist and perform display enhancement processing on the video file, when the decoding information is not abnormal.

In the embodiments of the present disclosure, an electronic device is further provided. The electronic device includes a memory and a processor. The memory is coupled to the processor. The memory stores instructions which, when being executed by the processor, cause the processor to implement operations of: acquiring decoding information when decoding a video file; decoding the video file with a decoding mode corresponding to a video file format of the video file; performing no display enhancement processing on the decoded video file, in response to determining the decoding information is abnormal; and performing the display enhancement processing on the decoded video file, in response to determining the decoding information is not abnormal.

In the embodiments of the present disclosure, a non-transitory computer-readable storage medium storing program codes thereon is further provided. The program codes, when being executed by a processor, cause the processor to implement operations of: acquiring decoding information when decoding a video file; decoding the video file with a decoding mode corresponding to a video file format of the video file, in response to determining the decoding information is not abnormal; converting the video file format of the video file into a target video file format, and decoding the video file with a decoding mode corresponding to the target video file format, in response to determining the decoding information is abnormal; and performing display enhancement processing on the decoded video file.

Embodiments

Figure 2:
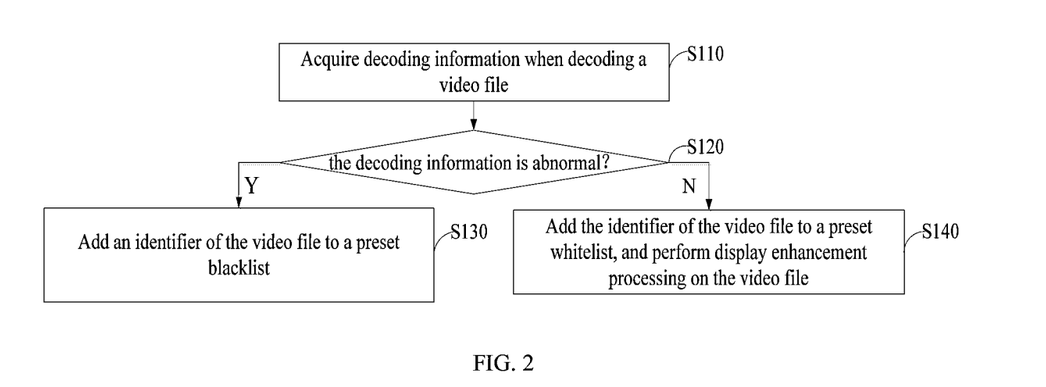
FIG. 2 illustrates a schematic flowchart of a video processing method provided by an embodiment of the present disclosure.

Referring to FIG. 2, a schematic flowchart of a video processing method provided by an embodiment of the present disclosure is illustrated. The video processing method is used to detect whether the decoding information of a video file acquired in the decoding process is abnormal, and dynamically manage the blacklist and whitelist according to the result of the detection, so as to reduce the probability of video jamming, and improve the playback effect and the user experience. In a specific implementation, the video processing method is applied to a video processing apparatus 200 shown in FIG. 9 and an electronic device 100 (FIG. 10) equipped with the video processing apparatus 200. In the following, the specific process of this embodiment will be illustrated with an electronic device serving as an example. Of course, it is understandable that the electronic device to which the embodiment can be applied may be a smart phone, a tablet computer, a wearable electronic device, a vehicle-mounted device, a gateway and the like, which is not limited here. The following will elaborate on the process shown in FIG. 2. Specifically, the video processing method may include operations as follows.

At block S110, decoding information is acquired when decoding a video file.

In an implementation, the video file decoded by the electronic device may be obtained from a cloud server or other electronic devices, or may be obtained locally, which is not limited here. In the case where the video file is obtained from the cloud server, the video file may be cached or downloaded by the electronic device from the cloud server, or obtained online by the electronic device from the cloud server. For example, the video file may be video data that is cached, downloaded, or obtained online by the electronic device from the cloud server with a video playback software installed on the electronic device. In the case where the video file is obtained locally by the electronic device, the video file may be video data downloaded in advance by the electronic device and stored in a local storage of the electronic device. In the case where the video file is acquired by the electronic device from other electronic devices, the video file may be transmitted from the other electronic devices to the electronic device through a wireless communication protocol, such as Wlan protocol, Bluetooth protocol, ZigBee protocol or WiFi protocol; or the video file may also be transmitted from the other electronic devices to the electronic device through a data network, such as a 2G network, a 3G network or a 4G network, which is not limited here.

And when the electronic device decodes the video file, the decoding information is detected and acquired. The decoding information may be detected in real time, at an interval of a preset period of time, or in a way set by the user. Optionally, in an implementation, the decoding information is detected in real time so as to ensure the accuracy of the detection of the decoding information. The decoding information may include a decoding duration, a decoding efficiency, a success rate of the decoding and the like, which are not limited here.

At block S120, it is detected whether the decoding information is abnormal.

In an implementation, preset decoding information is set and stored in the electronic device in advance, as a judgment basis for the decoding information. As such, after the decoding information is acquired when the electronic device decodes the video file, the decoding information is compared with the preset decoding information to detect whether the decoding information meets the preset decoding information. When the decoding information meets the preset decoding information, it indicates that the decoding information is abnormal. When the decoding information does not meet the preset decoding information, it indicates that the decoding information is not abnormal. In the embodiment, when the decoding information is abnormal, problems such as screen flicker and jamming of the electronic device may be caused.

For example, in a case where the decoding information is the decoding duration, the preset decoding information may be a preset duration, and the decoding duration may be compared with the preset duration of the preset decoding information to detect whether the decoding duration is greater than the preset duration. When the decoding duration is greater than the preset duration, it indicates that the decoding information meets the preset decoding information, that is, the decoding information is abnormal. When the decoding duration is smaller than or equal to the preset duration, it indicates that the decoding information does not meet the preset decoding information, that is, the decoding information is not abnormal.

For example, in a case where the decoding information is the decoding efficiency, the preset decoding information may be an amount of decoding within a preset time period, and the decoding efficiency and the amount of decoding within the preset time period of the preset decoding information may be compared to detect whether the decoding efficiency is greater than the amount of decoding within the preset time period. When the decoding efficiency is greater than the amount of decoding within the preset time period, it indicates that the decoding information does not meet the preset decoding information, that is, the decoding information is not abnormal. When the decoding efficiency is smaller than or equal to the amount of decoding within the preset time period, it indicates that the decoding information meets the preset decoding information, that is, the decoding information is abnormal.

For example, in a case where the decoding information is the success rate of the decoding, the preset decoding information may be a ratio, and the success rate of decoding may be compared with the ratio of the preset decoding information to detect whether the success rate of the decoding is greater than the ratio. When the success rate of the decoding is greater than the ratio, it indicates that the decoding information does not meet the preset decoding information, that is, the decoding information is not abnormal. When the success rate of the decoding is smaller than or equal to the ratio, it indicates that the decoding information meets the preset decoding information, that is, the decoding information is abnormal.

At block S130, an identifier of the video file is added to a preset blacklist, in response to detecting the decoding information is abnormal.

In the case where the decoding information is determined to be abnormal, other processing performed during the decoding process of the video file may cause problems of screen flicker and jamming to the video playback. For example, during the decoding process, execution of the display enhancement processing may cause problems of screen flicker and jamming to the video playback. In this case, the identifier of the video file may be added to a preset blacklist. In an implementation, a blacklist may be set and stored in the electronic device in advance, as a preset blacklist. The preset blacklist may be used to record video files whose decoding information is abnormal during the decoding process. Therefore, when the decoding information of the video file is determined to be abnormal, the identifier of the video file may be added to the preset blacklist. The identifier of the video file may include an identity identifier, serial number, identification code, format identifier and the like of the video file.

The display enhancement processing on the video file may include exposure enhancement, denoising, edge sharpening, contrast enhancement, saturation enhancement, image rendering or the like. Therefore, the electronic device needs to provide sufficient GPU resources. In the case where the decoding information of a video file acquired during the decoding process is determined to be abnormal, it can be considered that this video file may occupy more GPU resources during the decoding process. Therefore, if the display enhancement processing is further performed on the video file, a problem that the decoding and the display enhancement processing of the video file occupy too many GPU resources will occur, which will cause video jamming and thus affect the video playback effects. Therefore, in the case where the decoding information of the video file acquired during the decoding process is determined to be abnormal, the display enhancement processing is not performed on the video file, so as to avoid the display enhancement processing from occupying the GPU resources. That is, the display enhancement processing is not performed on the video file whose identifier is added to the blacklist, so as to reduce the possibility of screen flicker and jamming of the video playback.

At block S140, the identifier of the video file is added to a preset whitelist, and display enhancement processing is performed on the video file, in response to detecting the decoding information is not abnormal.

In the case where the decoding information is determined to be not abnormal, other processing performed during the decoding process of the video file may not cause problems of screen flicker and jamming to the video playback. For example, during the decoding process, execution of the display enhancement processing may not cause problems of screen flicker and jamming to the video playback. In this case, the identifier of the video file may be added to a preset whitelist. In an implementation, a whitelist may be set and stored in the electronic device in advance, as a preset whitelist. The preset whitelist may be used to record video files whose decoding information is not abnormal during the decoding process. Therefore, when the decoding information of the video file is determined to be not abnormal, the identifier of the video file may be added to the preset whitelist. The identifier of the video file may include the identity identifier, serial number, identification code, format identifier, and the like of the video file.

Since the decoding information of the video file is not abnormal during the decoding process, the execution of the display enhancement processing on the video file will not cause the problems of screen flicker and jamming to the video playback. Accordingly, the display enhancement processing may be performed on the video file to improve the display effect of the video file.

In an implementation, the display enhancement processing may include at least one selected from exposure enhancement, denoising, edge sharpening, contrast enhancement, and saturation enhancement.

Since image data of each frame of the decoded video data is in a RGBA format, it is necessary to convert the data in the RGBA format to data in a HSV format so as to perform the display enhancement processing on the video data. Specifically, a histogram of the image data is acquired, and statistical processing is performed on the histogram to obtain parameters for converting the data in the RGBA format into data in the HSV format; thereafter, the data in the RGBA format may be converted into the data in the HSV format, according to the parameters.

The exposure enhancement may be used to increase brightness of the image. For area(s) on the image where the brightness is low, the respective brightness may be increased by means of the histogram of the image. In addition, the brightness of the image may also be increased by nonlinear superposition. Specifically, let I represent a dark image to be processed, and T represent a bright image after processing, the exposure enhancement method may be expressed as $T(x)=I(x)+(1-I(x))*I(x)$, where T and I are both images having values of [0,1]. If the effect is not good enough after one processing, the algorithm may be iterated multiple times.

The denoising on the image data is used to remove noises of the image. Specifically, the quality of the image may be deteriorated due to disturbance and effect caused by various noises during the generation and transmission, which negatively influences the subsequent processing on the image and the visual effect of the image. There are many kinds of noises, such as electrical noise, mechanical noise, channel noise and other noises. Therefore, in order to suppress the noises and improve the image quality to facilitate subsequent processing, a denoising preprocessing has to be performed on the image. From the viewpoint of the probability distribution of the noises, the noises include Gaussian noise, Rayleigh noise, gamma noise, exponential noise and uniform noise.

In an implementation, a Gaussian filter may be used to denoise the image. The Gaussian filter is a linear filter that can effectively suppress the noises and smooth the image. The working principle of the Gaussian filter is similar to that of a mean filter, where each of the two filters takes an average value of the pixels in the window of the filter as an output. The coefficients of the window template of the Gaussian filter are different from those of the mean filter. The coefficients of the template of the mean filter are all set as 1, whereas the coefficients of the template of the Gaussian filter decrease as the distance from the center of the template increases. Therefore, the Gaussian filter less blurs the image compared with the mean filter.

For example, a 5×5 Gaussian filtering window is generated, and sampling is performed with the center of the template set as the origin. The coordinates of various positions of the template are plug into the Gaussian function, thereby obtaining the coefficients of the template. Then, the image is convolved with the Gaussian filtering window so as to be denoised.

The edge sharpening is used to make a blurred image become clear. There are generally two methods for image sharpening: one is differentiation, and the other is high-pass filtering.

The contrast enhancement is used to improve the image quality of the image, so as to make the colors in the image contrasting. Specifically, contrast stretching is one way for image enhancement, and it also belongs to gray-scale transformation. By means of the gray-scale transformation, the gray-scale values are expanded to the entire interval of 0-255; accordingly, the contrast is obviously and substantially enhanced. The following formula may be used to map the gray-scale value of a certain pixel to a larger gray-scale space:

$$I(x,y)=[(I(x,y)-I\min)/(I\max-I\min)](MAX-MIN)+MIN;$$

where Imin and Imax are the minimum and maximum gray-scale values of the original image, and MIN and MAX are the minimum and maximum gray-scale values of the expanded gray-scale space.

In the video processing method provided by the embodiment of the present disclosure, decoding information is acquired when decoding a video file, and it is detected whether the decoding information is abnormal. In the case where the decoding information is abnormal, an identifier of the video file is added to a preset blacklist; and in the case where the decoding information is not abnormal, the identifier of the video file is added to a preset whitelist and the display enhancement processing is performed on the video file. As such, by detecting whether the decoding information of the video file acquired during the decoding process is abnormal and dynamically managing the blacklist and the whitelist based on the result of the detection, the probability of video jamming is reduced, and the playback effect and user experience are improved.

Figure 3:
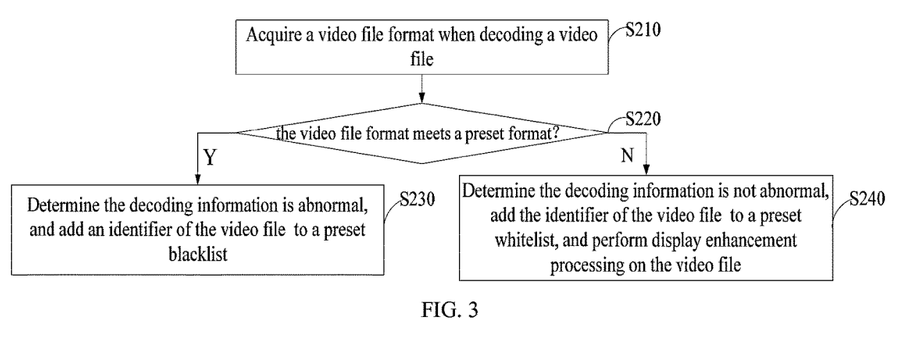
FIG. 3 illustrates a schematic flowchart of another video processing method provided by an embodiment of the present disclosure.

Referring to FIG. 3, a schematic flowchart of a video processing method provided by another embodiment of the present disclosure is illustrated. The video processing method is applied to the electronic device mentioned above. The following will elaborate on the process shown in FIG. 3. Specifically, the method may include operations as follows.

At block S210, a video file format of a video file is acquired when decoding the video file.

During the process of decoding a video file, the video file is identified to obtain a video file format of the video file. It is understandable that the video file format is used to represent a format in which the video file is saved. The video file format of the video file may include: wmv format, asf format and asx format for Microsoft Video; rm format and rmvb format for Real Player; MP4 format for MPEG video; 3 gp format for mobile video; mov format and m4v format for Apple video; and avi format, dat format, mkv format, flv format, vob format for other common videos, and the like. In an implementation, the video file format of the video file is determined through an identification operation. Specifically, the suffix of the video file may be obtained by viewing an extension of the video file or by viewing attributes of the video file; accordingly, the video file format of the video file may be acquired.

At block S220, it is detected whether the video file format meets a preset format.

In an implementation, a preset format is set in advance and stored locally in the electronic device, as a judgment basis for the video file format. After the video file format of the video file is acquired, the video file format of the video file is compared with a preset format to detect whether the video file format of the video file meets the preset format. That is, in this embodiment, the decoding information includes the video file format of the video file, and the preset decoding information includes a preset format.

In an implementation, the preset format may include one preset video file format or multiple preset video file formats. In an implementation, in the case where the preset format includes one video file format, the video file format of the video file is compared with the one preset video file format, and it is determined that the video file format of the video file meets the preset format in response to detecting the video file format of the video file is consistent with the one preset video file format, otherwise, it is determined that the video file format of the video file does not meet the preset format. In the case where the preset format includes multiple preset video file formats, the video file format of the video file is compared with each of the multiple preset video file formats, and it is determined that the video file format of the video file meets the preset format in response to detecting the video file format of the video file is consistent with one of the multiple preset video file formats, otherwise, it is determined that the video file format of the video file does not meet the preset format. That is, it is determined that the video file format of the video file does not meet the preset format, when the video file format of the video file is not consistent with any one of the multiple preset video file formats.

A preset format blacklist is set in the electronic device, and a video file format included in the preset format blacklist is poor in terms of the decoding performance, that is, such a video file format needs to take a long time for decoding, and thus the GPU resources are occupied for a long time. In an implementation, all video file formats meeting the preset format may be added to the preset format blacklist. In specific, when a video file format is included in the preset format blacklist, the video decoding performance corresponding to the video file format is poor. In an implementation, the preset format may include at least the wmv format.

Figure 4:
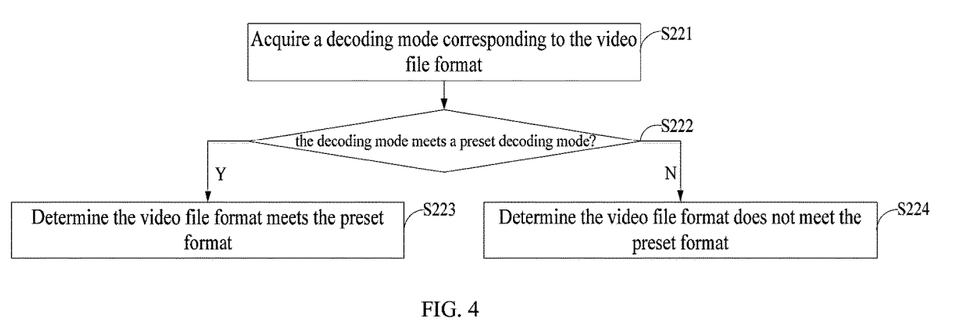
FIG. 4 illustrates a schematic flowchart of block S220 of the video processing method provided by the embodiment shown in FIG. 3 of the present disclosure.

Referring to FIG. 4, a schematic flowchart of block S220 of the video processing method shown in FIG. 3 of the present disclosure is illustrated. The following will elaborate on the process shown in FIG. 4. Specifically, the block S220 may include operations as follows.

At block S221, a decoding mode corresponding to the video file format is acquired.

It is understandable that different videos are usually compressed using different encoders. Therefore, the video file corresponding to the video file format needs to be decoded with a corresponding decoding mode. The commonly used codecs may include: Part 2 of MPEG-1, Part 2 of MPEG-2, Part 2 of MPEG-4, Part 10 of MPEG-4, DivX, XviD, 3ivx, or the like.

In an implementation, a mapping table may be pre-configured and stored in the electronic device. The mapping table includes at least correspondences between video file formats and decoding modes, as shown in Table 1, in which A represents the video file format and B represents the decoding mode. In an implementation, the correspondences between the video file formats and the decoding modes may include: each video file format corresponding to one decoding mode, that is, there is one-to-one correspondence between the video file formats and the decoding modes; each video file format corresponding to multiple decoding modes; multiple video file formats corresponding to one decoding mode, or the like, which is not limited here. Specifically, after the video file format of the video file is acquired, the mapping table is searched for a pre-stored video file format that is consistent with the video file format of the video file, and then is searched for a decoding mode corresponding to the pre-stored video file format. The searched decoding mode may be regarded as the decoding mode corresponding to the video file format of the video file.

TABLE 1

| Video file format | Decoding mode |
| --- | --- |
| A1 | B1 |
| A2 | B2 |
| A3 | B3 |

At block S222, it is detected whether the decoding mode meets a preset decoding mode.

In an implementation, a preset decoding mode is set in advance and stored locally in the electronic device, as a judgment basis for the decoding mode corresponding to the video file format. After the decoding mode corresponding to the video file format is acquired, the decoding mode is compared with the preset decoding mode to detect whether the decoding mode meets the preset decoding mode.

In an implementation, the preset decoding mode may include one preset decoding mode or multiple preset decoding modes. In an implementation, in the case where the preset decoding mode includes one preset decoding mode, the decoding mode corresponding to the video file format is compared with the one preset decoding mode, and it is determined that the decoding mode corresponding to the video file format meets the preset decoding mode in response to detecting the decoding mode corresponding to the video file format is consistent with the one preset decoding mode, otherwise, it is determined that the decoding mode corresponding to the video file format does not meet the preset decoding mode. In the case where the preset decoding mode includes multiple preset decoding modes, the decoding mode corresponding to the video file format is compared with each of the multiple preset decoding modes, and it is determined that the decoding mode corresponding to the video file format meets the preset decoding mode in response to detecting the decoding mode corresponding to the video file format is consistent with any one of the multiple preset decoding modes, otherwise, it is determined that the decoding mode corresponding to the video file format does not meet the preset decoding mode. That is, it is determined that the decoding mode corresponding to the video file format does not meet the preset decoding mode, when the decoding mode corresponding to the video file format is not consistent with any one of the multiple preset decoding modes.

Similarly, a preset decoding mode blacklist is set in the electronic device, and a decoding mode included in the preset decoding mode blacklist is poor in terms of the decoding performance, that is, it needs to take a long time for decoding the corresponding video file format, and thus the GPU resources are occupied for a long time. In an implementation, all decoding modes meeting the preset decoding mode may be added to the preset decoding mode blacklist. In specific, when a decoding mode is included in the preset decoding mode blacklist, the performance of the decoding mode is poor. In an implementation, the preset decoding mode may include at least Video Codec 1 software (vclsw) decoding.

At block S223, it is determined that the video file format meets the preset format in response to detecting the decoding mode meets the preset decoding mode.

In an implementation, there is a correspondence between the decoding mode and the video file format. That is, if the performance of the decoding mode is poor, the video file format corresponding to the decoding mode is more time-consuming for the decoding; and if the performance of the decoding mode is good, the video file format corresponding to the decoding mode is less time-consuming for the decoding. Further, when it is determined that the decoding mode corresponding to the video file format meets the preset decoding mode, it may be considered that the corresponding video file format is poor in terms of the decoding performance and is time-consuming for the decoding. Therefore, it may be confirmed that the video file format meets the preset format.

At block S224, it is determined that the video file format does not meet the preset format, in response to detecting the decoding mode does not meet the preset decoding mode.

In another aspect, when it is determined that the decoding mode corresponding to the video file format does not meet the preset decoding mode, it may be considered that the video file format is good in terms of the decoding performance, and it takes a short time for the decoding. Therefore, it can be confirmed that the video file format does not meet the preset format.

At block S230, it is determined that the decoding information is abnormal, and an identifier of the video file is added to a preset blacklist, in response to detecting the video file format meets the preset format.

Figure 5:
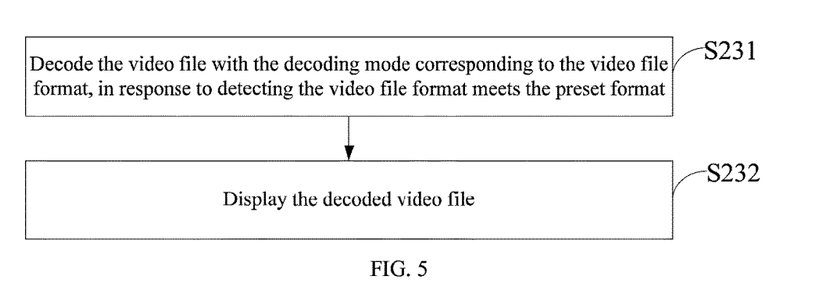
FIG. 5 illustrates a schematic flowchart of block S230 of the video processing method provided by the embodiment shown in FIG. 3 of the present disclosure.

Referring to FIG. 5, a schematic flowchart of block S230 of the video processing method shown in FIG. 3 of the present disclosure is illustrated. The following will elaborate on the process shown in FIG. 5. Specifically, the block S230 may include operations as follows.

At block S231, the video file is decoded with the decoding mode corresponding to the video file format, in response to detecting the video file format meets the preset format.

Specifically, when the video file format meets the preset format, the video file is decoded with the decoding mode meeting the preset decoding mode. For example, in a case where the video file format of the video file is the wmv format, the video file is decoded with the corresponding decoding mode of vclsw.

At block S232, the decoded video file is displayed.

In an implementation, the decoded video file is directly displayed on the electronic device after undergoing conventional processing. In other words, no display enhancement processing is performed on the decoded video file, so as to avoid the problem of video jamming caused by a fact that too many GPU resources are occupied by the display enhancement processing.

At block S240, it is determined that the decoding information is not abnormal and the identifier of the video file is added to a preset whitelist, and the display enhancement processing is performed on the video file, in response to detecting the video file format does not meet the preset format.

Figure 6:
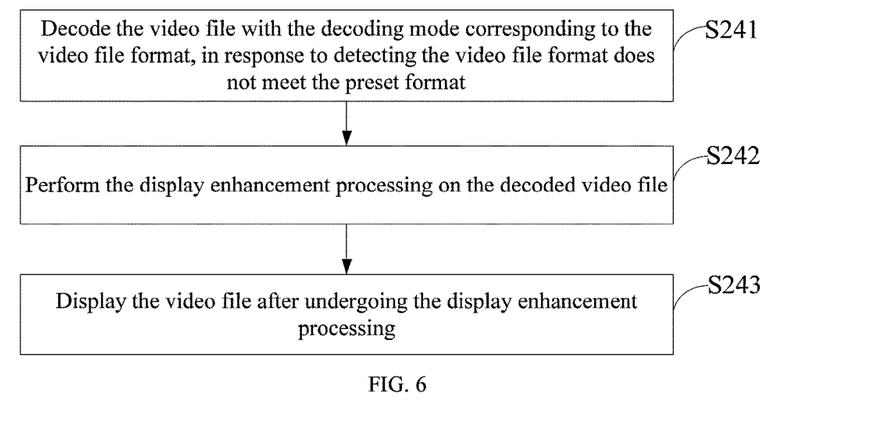
FIG. 6 illustrates a schematic flowchart of block S240 of the video processing method provided by the embodiment shown in FIG. 3 of the present disclosure.

Referring to FIG. 6, a schematic flowchart of block S240 of the video processing method shown in FIG. 3 of the present disclosure is illustrated. The following will elaborate on the process shown in FIG. 6. Specifically, the block S240 may include operations as follows.

At block S241, the video file is decoded with the decoding mode corresponding to the video file format, in response to detecting the video file format does not meet the preset format.

Specifically, when the video file format does not meet the preset format, the video file is decoded with the decoding mode that does not meet the preset decoding mode. For example, in a case where the video file format of the video file is the MP4 format, the video file is decoded with a corresponding MP4 decoding mode.

At block S242, the display enhancement processing is performed on the decoded video file.

In an implementation, in the case where the video file format does not meet the preset format, the video file format corresponding to the video file is good in terms of the decoding performance, and it takes a short time and occupies less GPU resources for the decoding.

Therefore, the execution of the display enhancement processing on the video file does not occupy too many GPU resources. Accordingly, the display enhancement processing may be performed on the video file, so as to improve the display effect of the video file.

At block S243, the video file after undergoing the display enhancement processing is displayed.

Specifically, the video file after undergoing the display enhancement processing is displayed on the electronic device, so that the user can watch the video file with a better playback effect, and thus the user experience is improved.

In the video processing method provided by the another embodiment of the present disclosure, a video file format of a video file is acquired when decoding the video file, and it is detected whether the video file format meets a preset format. In the case where the video file format meets the preset format, it is determined that the decoding information is abnormal, and an identifier of the video file is added to a preset blacklist. In the case where the video file format does not meet the preset format, it is determined that the decoding information is not abnormal, and the identifier of the video file is added to a preset whitelist, and the display enhancement processing is performed on the video file. Different from the video processing method shown in FIG. 2, in this embodiment, the video file format of the video file is recognized, and the display enhancement processing is performed when the video file format does not meet the preset format, so as to reduce the probability of video jamming and improve the playback effect and the user experience.

Figure 7:
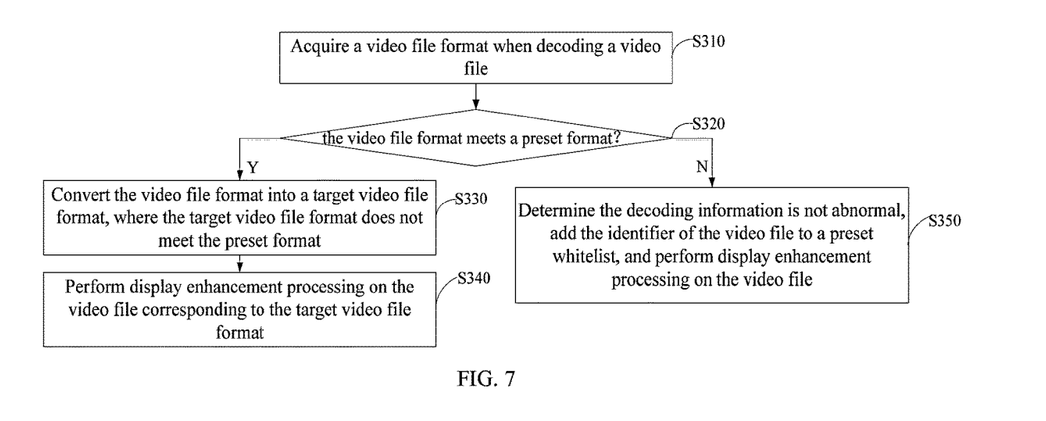
FIG. 7 illustrates a schematic flowchart of a further video processing method provided by an embodiment of the present disclosure.

Referring to FIG. 7, a schematic flowchart of a video processing method provided by a further another embodiment of the present disclosure is illustrated. The following will elaborate on the process shown in FIG. 7. Specifically, the method may include operations as follows.

At block S310, a video file format of a video file is acquired when decoding the video file.

At block S320, it is detected whether the video file format meets a preset format.

For the specific description of blocks S310 to S320, reference may be made to blocks S210 to S220, which will not be repeated here.

At block S330, the video file format of the video file is converted into a target video file format in response to detecting the video file format meets the preset format, where the target video file format does not meet the preset format.

In an implementation, in the case where the video file format is determined to meet the preset format, the execution of the display enhancement processing on the video file would cause the video playback to be jammed under this video file format. Therefore, in order to avoid the playback of the video file from jamming, and to improve the video playback effect, the video file format of the video file may be converted into a target video file format, where the target video file format does not meet the preset format. It is understandable that, in this way, the video file corresponding to the target video file format no longer occupies too many GPU resources for the decoding, and the display enhancement processing may be performed on the video file to improve the playback effect of the video file.

Figure 8:
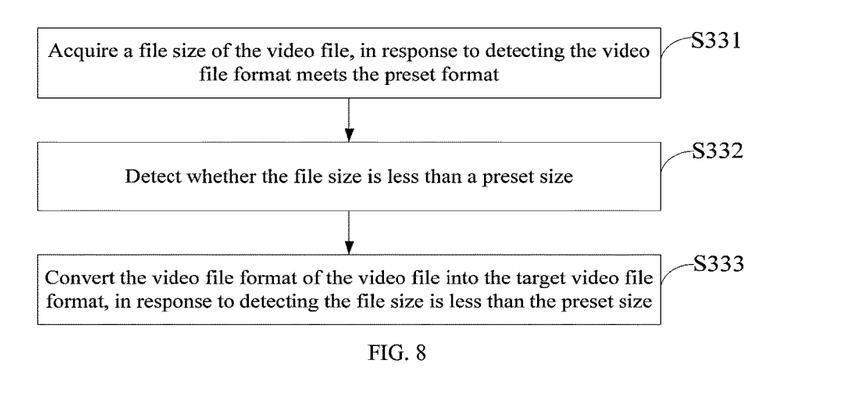
FIG. 8 illustrates a schematic flowchart of block S330 of the video processing method provided by the embodiment shown in FIG. 7 of the present disclosure.

Referring to FIG. 8, a schematic flowchart of block S330 of the video processing method shown in FIG. 7 of the present disclosure is illustrated. The following will elaborate on the process shown in FIG. 8. Specifically, the block S330 may include operations as follows.

At block S331, a file size of the video file is acquired in response to detecting the video file format meets the preset format.

It can be understood that the size of the video file is positively correlated with the time required for converting the format of the video file. That is, the larger the file size of the video file, the longer the time required for converting the format of the video file; and the less the file size of the video file, the shorter the time required for converting the format of the video file. Therefore, in an implementation, before converting the video file format of the video file, the size of the video file may be acquired. The file size of the video file may be 20 M, 50 M, 300 M, or the like, which is not limited here.

At block S332, it is detected whether the file size is less than a preset size.

In an implementation, a preset size is set in advance and stored locally in the electronic device, as a judgment basis for the file size of the video file. After the file size of the video file is acquired, the file size of the video file is compared with the preset size to detect whether the file size of the video file is less than the preset size. For example, the preset size is 200 M, and it may be determined that the file size of the video file is less than the preset size when the file size of the video file is 50 M, and it may be determined that the file size of the video file is larger than the preset size when the file size of the video file is 300 M.

At block S333, the video file format of the video file is converted into the target video file format in response to detecting the file size is less than the preset size.

In the case where the file size of the video file is less than the preset size, it would take a short time to convert the format of the video file, that is, it would not cause a long waiting time. Therefore, the video file format of the video file may be converted into a video file format that does not meet the preset format, such as the target video file format.

On the contrary, in the case where the file size of the video file is greater than the preset size, it would take a long time to convert the format of the video file, that is, it would cause a long waiting time. Therefore, the video file format of the video file may not be converted.

At block S340, the display enhancement processing is performed on the video file corresponding to the target video file format.

It is understandable that the target video file format does not meet the preset format. Therefore, during the process of decoding the video file corresponding to the target video file format, the decoding mode of good decoding performance may be adopted, which would not occupy too many GPU resources. Thus, the display enhancement processing may be performed on the video file to improve the playback effect of the video file. In an implementation, the video file may be decoded with a decoding mode corresponding the target video file format, and the display enhancement processing is performed on the decoded video file.

At block S350, it is determined that the decoding information is not abnormal, the identifier of the video file is added to a preset whitelist, and the display enhancement processing is performed on the video file, in response to detecting the video file format does not meet the preset format.

In the video processing method provided by the further another embodiment of the present disclosure, a video file format of a video file is acquired when decoding the video file, and it is detected whether the video file format meets a preset format. In the case where the video file format meets the preset format, the video file format of the video file is converted into a target file format that does not meet the preset format, and the display enhancement processing is performed on the video file corresponding to the target video file format. In the case where the video file format does not meet the preset format, it is determined that the decoding information is not abnormal, the identifier of the video file is added to a preset whitelist, and the display enhancement processing is performed on the video file. Different from the video processing method shown in FIG. 2, in the embodiment, when the video file format of the video file meets the preset format, the video file format of the video file is converted into a target video file format that does not meet the preset format, so that the display enhancement processing may be performed on the video file, thereby improving the display effect of the video file.

Figure 9:
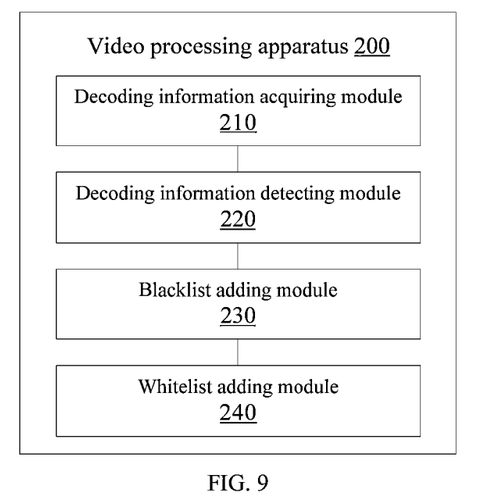
FIG. 9 illustrates a block diagram of a video processing apparatus provided by an embodiment of the present disclosure.

Referring to FIG. 9, a block diagram of a video processing apparatus 200 according to an embodiment of the present disclosure is illustrated. The video processing apparatus 200 is applied to the electronic device mentioned above. The following will elaborate on the block diagram shown in FIG. 9. The video processing apparatus 200 may include a decoding information acquiring module 210, a decoding information detecting module 220, a blacklist adding module 230, and a whitelist adding module 240.

The decoding information acquiring module 210 is configured to acquire decoding information when the electronic device decodes a video file.

The decoding information detecting module 220 is configured to detect whether the decoding information is abnormal. In an implementation, the decoding information may include a video file format of the video file, and the decoding information detecting module 220 may include a format detecting sub-module, an abnormality determining sub-module, and a no-abnormality determining sub-module.

The format detecting sub-module is configured to detect whether the video file format meets a preset format. In an implementation, the format detecting sub-module includes a decoding mode acquiring unit, a decoding mode detecting unit, a first format determining unit, and a second format determining unit.

The decoding mode acquiring unit is configured to acquire a decoding mode corresponding to the video file format.

The decoding mode detecting unit is configured to detect whether the decoding mode meets a preset decoding mode.

The first format determining unit is configured to determine the video file format meets the preset format, when the decoding mode meets the preset decoding mode.

The second format determining unit is configured to determine the video file format does not meet the preset format, when the decoding mode does not meet the preset decoding mode.

The abnormality determining sub-module is configured to determine the decoding information is abnormal when the video file format meets the preset format. In an implementation, the abnormality determining sub-module includes a first decoding unit, a first displaying unit, a format converting unit and a first display enhancement processing unit.

The first decoding unit is configured to decode the video file with the decoding mode corresponding to the video file format, when the video file format meets the preset format.

The first displaying unit is configured to display the decoded video file.

The format converting unit is configured to convert the video file format of the video file into a target video file format, when the video file format meets the preset format, where the target video file format does not meet the preset format. In an implementation, the format converting unit includes a file size acquiring subunit, a file size detecting subunit and a format converting subunit.

The file size acquiring subunit is configured to acquire a file size of the video file, when the video file format meets the preset format.

The file size detecting subunit is configured to detect whether the file size is less than a preset size.

The format converting subunit is configured to convert the video file format of the video file into the target video file format, when the file size is less than the preset size.

The first display enhancement processing unit is configured to perform the display enhancement processing on the video file corresponding to the target video file format.

The no-abnormality determining sub-module is configured to determine the decoding information is not abnormal, when the video file format does not meet the preset format. In an implementation, the no-abnormality determining sub-module includes a second decoding unit, a second display enhancement processing unit and a second displaying unit.

The second decoding unit is configured to decode the video file with the decoding mode corresponding to the video file format, when the video file format does not meet the preset format.

The second display enhancement processing unit is configured to perform the display enhancement processing on the decoded video file.

The second displaying unit is configured to display the video file after the display enhancement processing.

The blacklist adding module 230 is configured to add an identifier of the video file to a preset blacklist, when the decoding information is abnormal.

The whitelist adding module 240 is configured to add the identifier of the video file to a preset whitelist, and perform the display enhancement processing on the video file, when the decoding information is not abnormal.

The video processing apparatus provided by the embodiment of the disclosure includes a decoding information acquiring module, a decoding information detecting module, a blacklist adding module and a whitelist adding module. The decoding information acquiring module is configured to acquire decoding information when the electronic device decodes a video file. The decoding information detecting module is configured to detect whether the decoding information is abnormal. The blacklist adding module is configured to add an identifier of the video file to a preset blacklist, when the decoding information is abnormal. The whitelist adding module is configured to add the identifier of the video file to a preset whitelist and perform the display enhancement processing on the video file, when the decoding information is not abnormal. As such, by detecting whether the decoding information of the video file acquired during the decoding process is abnormal, and dynamically managing the blacklist and the whitelist based on the result of the detection, the probability of video jamming is reduced, and the playback effect and user experience are improved.

Those skilled in the art can clearly understand that, regarding the specific working process of the apparatus and various modules described above, reference may be made to the corresponding process in the foregoing method embodiments, which will not be repeated here, for the convenience and conciseness of the description.

In the various embodiments provided in this disclosure, the coupling between the modules may be electrical, mechanical or in other forms.

In addition, the various functional modules in the embodiments of the present disclosure may be integrated into one processing module, or each module may exist alone physically, or two or more modules may be integrated into one module. The integrated module(s) mentioned above may be implemented in hardware or software functional modules.

Figure 10:
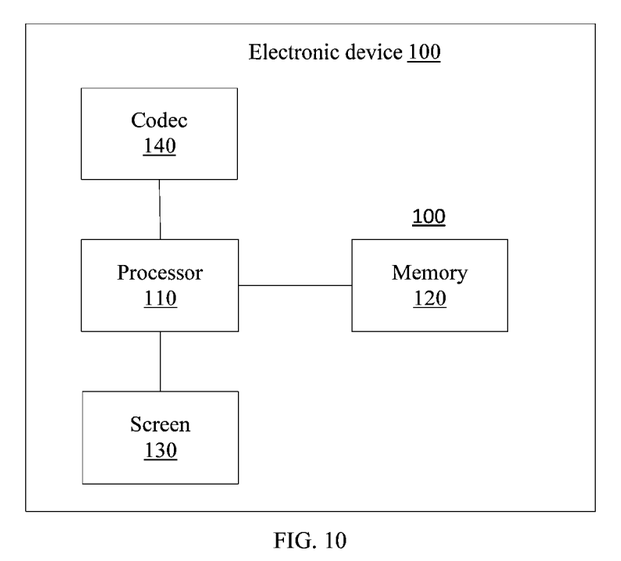
FIG. 10 illustrates a block diagram of an electronic device provided by an embodiment of the present disclosure, where the electronic device is configured to execute the video processing method according to the embodiments of the present disclosure.

Referring to FIG. 10, a structural block diagram of an electronic device 100 provided by an embodiment of the present disclosure is illustrated. The electronic device 100 may be an electronic device capable of running application programs, such as a smart phone, a tablet computer or an e-book. The electronic device 100 in this disclosure may include one or more of the following components: a processor 110, a memory 120, a screen 130, a codec 140 and one or more application programs. The one or more application programs may be stored in the memory 120 and configured to be executed by one or more processors 110. The one or more programs are configured to execute the methods described in the foregoing method embodiments.

In an implementation, instructions of the one or more programs which, when being executed by the processor 110, may cause the processor 110 to implement operations comprising: acquiring decoding information when decoding a video file; decoding the video file with a decoding mode corresponding to a video file format of the video file; performing no display enhancement processing on the decoded video file, in response to determining the decoding information is abnormal; and performing the display enhancement processing on the decoded video file, in response to determining the decoding information is not abnormal.

The determining the decoding information is abnormal may include: determining the decoding information is abnormal, in response to detecting the video file format is consistent with a preset format. And the detecting the video file format is consistent with a preset format may include: determining the video file format is consistent with the preset format, in response to detecting a decoding mode corresponding to the video file format is consistent with a preset decoding mode. With regard to other details of the acquisition of the decoding information, the decoding of the video file, the determining of the abnormality of the decoding information, the display enhancement processing and the subsequent displaying operation, reference may be made to the foregoing, which will not be repeated here.

The processor 110 may include one or more processing cores. The processor 110 uses various interfaces and lines to connect various parts of the entire electronic device 100, and performs various functions and processes data of the electronic device 100 by running or executing instructions, program(s), code sets or instruction sets stored in the memory 120, and calling data stored in the memory 120. Optionally, the processor 110 may be implemented in at least one selected from a Digital Signal Processor (DSP), a Field-Programmable Gate Array (FPGA) and a Programmable Logic Array (PLA). The processor 110 may be integrated with one of a Central Processing Unit (CPU), a Graphics Processing Unit (GPU), a modem and the like, or a combination thereof. The CPU mainly processes the operating system, user interface and application programs. The GPU is responsible for rendering and drawing the display contents. The modem is used for the wireless communication. It can be understood that the above-mentioned modem may not be integrated into the processor 110, and may be implemented by a separate communication chip.

The memory 120 may include a Random Access Memory (RAM), or may also include a Read-Only Memory (ROM). The memory 120 may be used to store instructions, programs, codes, code sets or instruction sets. The memory 120 may include a program storage area and a data storage area. The program storage area may store instructions for implementing the operating system, instructions for implementing at least one function (such as a touch function, a sound playback function or an image display function), instructions for implementing the various method embodiments, and the like. The data storage area can store data (such as a phone book, audio and video data, chat record data) created by the electronic device 100 during use.

The codec 140 may be used to encode or decode video data, and then transmit the decoded video data to the screen 130 for display. The codec 140 may be a GPU, a dedicated DSP, an FPGA, an ASIG chip or the like.

Figure 11:
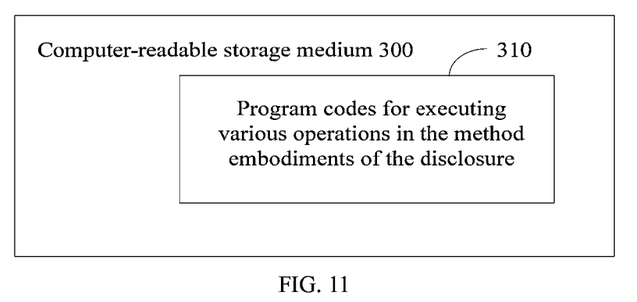
FIG. 11 illustrates a storage unit configured to store or carry program codes provided by an embodiment of the present disclosure, where the program codes are configured for implementation of the video processing method according to the embodiments of the present disclosure.

Referring to FIG. 11, a structural block diagram of a computer-readable storage medium provided by an embodiment of the present disclosure is illustrated. The computer-readable storage medium 300 stores program codes therein, and the program codes are configured to be invoked by a processor to execute the method described in the foregoing method embodiments.

In an implementation, the program codes which, when being executed by the processor 110, may cause the processor 110 to implement operations including: acquiring decoding information when decoding a video file; decoding the video file with a decoding mode corresponding to a video file format of the video file, in response to determining the decoding information is not abnormal; converting the video file format of the video file into a target video file format, and decoding the video file with a decoding mode corresponding to the target video file format, in response to determining the decoding information is abnormal; and performing display enhancement processing on the decoded video file.

With regard to details of the acquisition of the decoding information, the decoding of the video file, the determining of the abnormality of the decoding information, the conversion of the video file format of the video file, the display enhancement processing and the subsequent displaying operation, reference may be made to the foregoing, which will not be repeated here.

The computer-readable storage medium 300 may be an electronic memory, such as flash memory, Electrically Erasable Programmable Read Only Memory (EEPROM), EPROM, hard disk or ROM. Optionally, the computer-readable storage medium 300 includes a non-transitory computer-readable storage medium. The computer-readable storage medium 300 has a storage space for the program codes 310 for executing various method operations in the above-mentioned methods. These program codes may be read from or written into one or more computer program products. The program codes 310 may for example be compressed in a suitable form.

In summary, with the video processing method and apparatus, electronic device and storage medium provided by the embodiments of the present disclosure, decoding information is acquired when an electronic device decodes a video file, and it is detected whether the decoding information is abnormal. In the case where the decoding information is abnormal, an identifier of the video file is added to a preset blacklist. In the case where the decoding information is not abnormal, the identifier of the video file is added to a preset whitelist, and display enhancement processing is performed on the video file. As such, by detecting whether the decoding information of the video file acquired during the decoding process is abnormal, and dynamically managing the blacklist and the whitelist according to the result of the detection, the probability of video jamming is reduced, and the playback effect and user experience are improved.

Finally, it should be noted that the above embodiments are only used to illustrate the technical solutions of the disclosure, rather than limit it. Although the disclosure has been described in detail with reference to the foregoing embodiments, those of ordinary skill in the art should understand that the technical solutions recorded in the foregoing embodiments may also be modified, or some technical features thereof may be equivalently replaced, and these modifications or replacements should not be considered as rendering the essence of the corresponding technical solution(s) depart from the spirit and scope of the technical solutions of the embodiments of the present disclosure.

What is claimed is:

1. A video processing method for an electronic device, the method comprising:
    acquiring decoding information when decoding a video file;
    in response to determining the decoding information is abnormal, determining that occupation of Graphic Processing Unit (GPU) resources of a processor when performing both decoding and display enhancement processing on the video file will cause video jamming, adding an identifier of the video file to a preset blacklist, and performing the decoding but no display enhancement processing on the video file; and
    in response to determining the decoding information is not abnormal, determining that occupation of the GPU resources of the processor when performing both decoding and display enhancement processing on the video file will not cause video jamming, adding the identifier of the video file to a preset whitelist and performing both the decoding and the display enhancement processing on the video file.

2. The method as claimed in claim 1, further comprising:
determining the decoding information is abnormal, in response to detecting the decoding information meets the preset decoding information; and
determining the decoding information is not abnormal, in response to detecting the decoding information does not meet the preset decoding information.

3. The method as claimed in claim 2, wherein the decoding information comprises a video file format of the video file, the preset decoding information comprises a preset format, and the method further comprises:
determining the decoding information meets the preset decoding information, in response to detecting the video file format meets the preset format; and
determining the decoding information does not meet the preset decoding information, in response to detecting the video file format does not meet the preset format.

4. The method as claimed in claim 3, wherein the preset format comprises a plurality of preset video file formats, and the method further comprises:
comparing the video file format with each of the plurality of preset video file formats;
determining the video file format meets the preset format, in response to detecting the video file format is consistent with one of the plurality of preset video file formats; and
determining the video file format does not meet the preset format, in response to detecting the video file format is not consistent with any one of the plurality of preset video file formats.

5. The method as claimed in claim 3, further comprising:
acquiring a decoding mode corresponding to the video file format;
determining the video file format meets the preset format, in response to detecting the decoding mode meets a preset decoding mode; and
determining the video file format does not meet the preset format, in response to detecting the decoding mode does not meet the preset decoding mode.

6. The method as claimed in claim 5, wherein the acquiring a decoding mode corresponding to the video file format comprises:
searching, from a mapping table, for a pre-stored video file format consistent with the video file format, wherein the mapping table comprises at least a correspondence between the pre-stored video file format and a decoding mode;
searching, based on the mapping table, for the decoding mode corresponding to the pre-stored video file format; and
taking the decoding mode corresponding to the pre-stored video file format, as the decoding mode corresponding to the video file format.

7. The method as claimed in claim 5, wherein the preset decoding mode comprises a plurality of preset decoding modes, and the method further comprises:
comparing the decoding mode with each of the plurality of preset decoding modes;
determining the decoding mode meets the preset decoding mode, in response to detecting the decoding mode is consistent with one of the plurality of preset decoding modes; and
determining the decoding mode does not meet the preset decoding mode, in response to detecting the decoding mode is not consistent with any one of the plurality of preset decoding modes.

8. The method as claimed in claim 5, wherein the preset format comprises at least a windows media video (wmv) format, and the decoding mode comprises at least video codec 1 software (vc1sw) decoding.

9. The method as claimed in claim 3, wherein the determining the decoding information meets the preset decoding information in response to detecting the video file format meets the preset format, comprises:
decoding the video file with a decoding mode corresponding to the video file format, in response to detecting the video file format meets the preset format; and
displaying the decoded video file.

10. The method as claimed in claim 3, wherein the adding the identifier of the video file to a preset whitelist and performing display enhancement processing on the video file, in response to determining the decoding information is not abnormal, comprises:
decoding the video file with a decoding mode corresponding to the video file format, in response to detecting the video file format does not meet the preset format;
performing the display enhancement processing on the decoded video file; and
displaying the video file after undergoing the display enhancement processing.

11. The method as claimed in claim 3, wherein the determining the decoding information meets the preset decoding information, in response to detecting the video file format meets the preset format, comprises:
converting the video file format of the video file into a target video file format in response to detecting the video file format meets the preset format, wherein the target video file format does not meet the preset format; and
performing the display enhancement processing on the video file corresponding to the target video file format.

12. The method as claimed in claim 11, wherein the converting the video file format of the video file into a target video file format in response to detecting the video file format meets the preset format, comprises:
acquiring a file size of the video file, in response to detecting the video file format meets the preset format; and
converting the video file format of the video file into the target video file format, in response to detecting the file size is less than the preset size.

13. The method as claimed in claim 2, wherein the decoding information comprises a decoding duration, the preset decoding information comprises a preset duration, and the method further comprises:
determining the decoding information meets the preset decoding information, in response to detecting the decoding duration is greater than the preset duration; and
determining the decoding information does not meet the preset decoding information, in response to detecting the decoding duration is smaller than or equal to the preset duration.

14. The method as claimed in claim 2, wherein the decoding information comprises a decoding efficiency, the preset decoding information is an amount of decoding within a preset time period, and the method further comprises:
determining the decoding information meets the preset decoding information, in response to detecting the decoding efficiency is greater than the amount of decoding within the preset time period; and determining the decoding information does not meet the preset decoding information, in response to detecting the decoding efficiency is smaller than or equal to the amount of decoding within the preset time period.

15. The method as claimed in claim 2, wherein the decoding information comprises a success rate of the decoding, the preset decoding information comprises a ratio, and the method further comprises:
determining the decoding information does not meet the preset decoding information, in response to detecting the success rate of the decoding is greater than the ratio; and
determining the decoding information meets the preset decoding information, in response to detecting the success rate of the decoding is smaller than or equal to the ratio.

16. The method as claimed in claim 1, wherein the identifier of the video file comprises at least one selected from an identity identifier, a serial number, an identification code, and a format identifier of the video file.

17. A non-transitory computer-readable storage medium storing program codes thereon, the program codes which, when being executed by a processor, cause the processor to implement operations comprising:
acquiring decoding information when decoding a video file;
in response to determining the decoding information is not abnormal, determining that occupation of Graphic Processing Unit (GPU) resources of the processor when performing both decoding and display enhancement processing on the video file will not cause video jamming, adding an identifier of the video file to a preset whitelist, and performing both the decoding and the display enhancement processing on the video file;
in response to determining the decoding information is abnormal, determining that occupation of the GPU resources of the processor when performing both decoding and display enhancement processing on the video file will cause video jamming, adding the identifier of the video file to a preset blacklist, and performing the decoding but no display enhancement processing on the video file.

* * * * *